US011370253B2

(12) United States Patent
Hoshino et al.

(10) Patent No.: US 11,370,253 B2
(45) Date of Patent: Jun. 28, 2022

(54) TIRE

(71) Applicant: SUMITOMO RUBBER INDUSTRIES, LTD., Hyogo (JP)

(72) Inventors: Takafumi Hoshino, Hyogo (JP); Yuya Meguro, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 746 days.

(21) Appl. No.: 16/054,574

(22) Filed: Aug. 3, 2018

(65) Prior Publication Data
US 2019/0054769 A1 Feb. 21, 2019

(30) Foreign Application Priority Data

Aug. 18, 2017 (JP) .............................. JP2017-158165

(51) Int. Cl.
| | |
|---|---|
| *B60C 11/03* | (2006.01) |
| *B60C 11/04* | (2006.01) |
| *B60C 11/11* | (2006.01) |
| *B60C 11/13* | (2006.01) |
| *B60C 11/12* | (2006.01) |

(52) U.S. Cl.
CPC .......... *B60C 11/0309* (2013.01); *B60C 11/04* (2013.01); *B60C 11/11* (2013.01); *B60C 11/1369* (2013.01); *B60C 11/12* (2013.01); *B60C 2011/0397* (2013.01); *B60C 2011/1361* (2013.01)

(58) Field of Classification Search
CPC ................................................ B60C 2011/1361
See application file for complete search history.

(56) References Cited

U.S. PATENT DOCUMENTS

| | | | |
|---|---|---|---|
| 5,024,260 A | 6/1991 | Ochiai | |
| 2014/0360640 A1* | 12/2014 | Fujioka | ............... B60C 11/0306 152/209.18 |
| 2018/0290500 A1* | 10/2018 | Yeo | ..................... B60C 11/1369 |

FOREIGN PATENT DOCUMENTS

| | | | | |
|---|---|---|---|---|
| DE | 102010016978 A1 * | 11/2011 | ............. | B60C 11/13 |
| DE | 102010016978 A1 | 11/2011 | | |
| FR | 3026347 A1 | 4/2016 | | |
| JP | 2002-29218 A | 1/2002 | | |

(Continued)

OTHER PUBLICATIONS

U.S. Appl. No. 16/051,836 to Yukiko Hinami, which was filed Aug. 1, 2018.

(Continued)

*Primary Examiner* — Alison L Hindenlang
*Assistant Examiner* — Virak Nguon
(74) *Attorney, Agent, or Firm* — Greenblum & Bernstein, P.L.C.

(57) ABSTRACT

A tire includes a tread portion provided with lateral grooves extending in a tire axial direction and blocks divided by the lateral grooves. At least one of the lateral grooves is provided with a first projected portion with a bottom protruding from a groove bottom of the at least one of the lateral grooves. The first projected portion includes at least one tie-bar portion connecting a pair of blocks with each other which is arranged adjacently through the at least one of the lateral groove, and a narrow rib-portion extending in a longitudinal direction of the at least one of the lateral groove from the at least one tie-bar portion without being connected to the pair of blocks.

20 Claims, 5 Drawing Sheets

(56) References Cited

FOREIGN PATENT DOCUMENTS

| JP | 2008-87628 A | 4/2008 |
|---|---|---|
| JP | 2013-035346 A | 2/2013 |

OTHER PUBLICATIONS

European Search Report issued in European Patent Office (EPO) Patent Application No. 18184090.1, dated Jan. 4, 2019.

* cited by examiner

TIRE

BACKGROUND ART

Field of the Invention

The present invention relates to tires, and more particularly to a tire including a tread portion provided with lateral grooves and blocks.

Description of the Related Art

Generally, tire treads are provided with circumferential grooves, lateral grooves, and blocks divided by these grooves. When such a tire rolls on unpaved gravel roads, there has been the problem that one or more small stones are trapped in some grooves and remain for a long term (hereinafter, referred to as "stone-biting"). Further, the trapped small stones tend to push the grooves repeatedly in such a manner as to expand the groove widths during running, and eventually some stones reach the bottoms of grooves. Thus, stone-biting causes cracks on the bottoms of the grooves.

Conventionally, in order to avoid stone-biting, the following Patent Literatures 1 and 2 propose providing small width projections which protrude locally from the bottoms of grooves.

Unfortunately, since the above-mentioned projections are configured such that the projections tend to bend down in the groove width direction, there has been a new problem that some small stones are trapped in a gap between the projection and one of groove walls.

Patent Literatures

[Patent Literature 1] Japanese Unexamined Patent Application Publication 2002-29218
[Patent Literature 2] Japanese Unexamined Patent Application Publication 2008-87628

SUMMARY OF THE DISCLOSURE

In view of the above problems in the conventional art, the present disclosure has an object to provide a tire capable of avoiding stone-biting for a long term.

According to one aspect of the disclosure, a tire includes a tread portion provided with lateral grooves extending in a tire axial direction and blocks divided by the lateral grooves. At least one of the lateral grooves is provided with a first projected portion having a bottom protruding from a groove bottom of the at least one of the lateral grooves. The first projected portion includes at least one tie-bar portion connecting a pair of blocks with each other which is arranged adjacently through the at least one of the lateral grooves, and a narrow rib-portion extending in a longitudinal direction of the at least one of the lateral grooves from the at least one tie-bar portion without being connected to the pair of blocks.

In another aspect of the disclosure, the at least one tie-bar portion may have a width in the longitudinal direction of the at least one of the lateral grooves greater than a rib width of the narrow rib-portion measured in a direction perpendicular to the longitudinal direction of the at least one of the lateral grooves.

In another aspect of the disclosure, the narrow rib-portion may be connected to a center region of the at least one tie-bar portion in a tire circumferential direction.

In another aspect of the disclosure, the first projected portion may include two tie-bar portions and the narrow rib-portion connecting the two tie-bar portions with each other.

In another aspect of the disclosure, the narrow rib-portion may extend in a zigzag manner.

In another aspect of the disclosure, a radial height of the first projected portion from the groove bottom may be in a range of from 20% to 50% of a maximum depth of the at least one of the lateral grooves.

In another aspect of the disclosure, a volume of the first projected portion may be in a range of from 10% to 25% of a total volume of the first projected portion and the at least one of the lateral grooves.

In another aspect of the disclosure, the narrow rib-portion may include a pair of sidewalls extending radially outwardly from the groove bottom of the at least one of the lateral grooves in a tapered manner, in a cross-sectional view of the narrow rib-portion perpendicular to the longitudinal direction of the at least one of the lateral grooves.

In another aspect of the disclosure, the at least one of the lateral grooves may further be provided with a second projected portion having a bottom protruding from the groove bottom on a location away from the first projected portion, and the second projected portion may consist of a tie-bar portion connecting the pair of blocks.

In another aspect of the disclosure, the second projected portion may be arranged axially inwardly of the first projected portion.

In another aspect of the disclosure, the at least one of the lateral grooves may extend in a zigzag manner, and the narrow rib-portion may extend in a zigzag manner along the at least one of the lateral grooves.

DESCRIPTION OF THE PREFERRED EMBODIMENTS

An embodiment of the present disclosure will be explained below with reference to the accompanying drawings.

Figure 1:
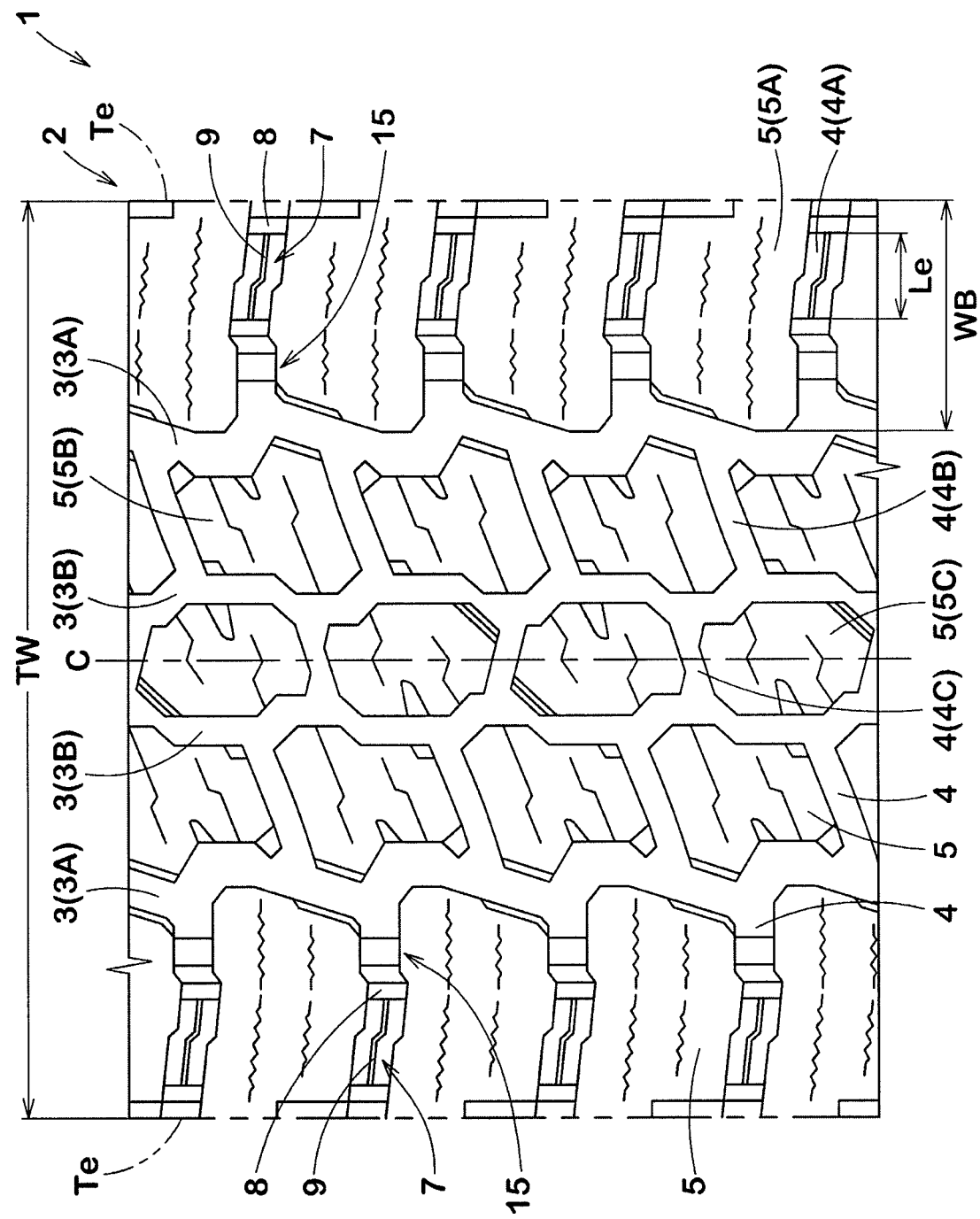
FIG. 1 is a development view of a tread portion in accordance with an embodiment of the present disclosure.

FIG. 1 illustrates a development view of a tread portion 2 of a tire 1 in accordance with an embodiment of the present disclosure. In this embodiment, as a preferred embodiment, a passenger car tire has been disclosed. Needless to say, the present disclosure can be embodied as other categorized tires, e.g. heavy-duty tire.

As illustrated in FIG. 1, the tread portion 2 is provided with one or more main grooves 3 extending in the tire circumferential direction and lateral grooves 4 extending in the tire axial direction from the main grooves 3.

In this embodiment, the main grooves 3 extend continuously in the tire circumferential direction. The main grooves 3, in this embodiment, include two shoulder main grooves 3A arranged nearest to the respective tread edges Te, and two crown main grooves 3B arranged between the shoulder main grooves 3A. In this embodiment, each of the crown main grooves 3B is located between the tire equator C and the corresponding shoulder main groove 3A. Note that the main grooves 3 are not limited to the above aspect but can be modified to other aspect.

As used herein, the tread edges Te refer to axially outermost edges of a contact patch of the tread portion 2 of the tire 1 which occurs under a standard loaded condition at zero camber angle.

As used herein, the standard loaded condition of the tire 1 is such that the tire 1 is mounted onto a standard wheel rim and inflated to a standard pressure and pushed onto a flat plane with a standard tire load.

As used herein, a standard condition of the tire 1 is such that the tire 1 is mounted onto the standard wheel rim (not illustrated) and inflated to the standard pressure but loaded with no tire load. An axial distance between the tread edge Te under the standard condition is defined as the tread width TW.

In this application including specification and claims, various dimensions, positions and the like of the tire 1 refer to those under the standard condition of the tire unless otherwise noted.

As used herein, the standard wheel rim is a wheel rim officially approved or recommended for the tire 1 by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire 1 by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

The lateral grooves 4, in this embodiment, includes shoulder lateral grooves 4A, middle lateral grooves 4B and crown lateral grooves 4C. The shoulder lateral groove 4A, on each side of the tire equator C, connect the shoulder main groove 3A and the tread edge Te. The middle lateral grooves 4B, on each side of the tire equator C, connect the shoulder main groove 3A and the crown main groove 3B. The crown lateral grooves 4C connect two crown main grooves 3B. Note that the lateral grooves 4 are not limited to the above aspect but can be modified to other aspect.

In this embodiment, the tread portion 2 is provided with blocks 5 defined by the main grooves 3 and the lateral grooves 5. The blocks 5, in this embodiment, include circumferentially spaced shoulder blocks 5A, middle blocks 5B, and crown blocks 5C. On each side of the tire equator C, the shoulder blocks 5A are divided by the tread edge Te, the shoulder main groove 3A and the shoulder lateral grooves 4A. On each side of the tire equator, the middle blocks 5B are divided by the shoulder main groove 3A, the crown main groove 3B and the middle lateral grooves 4B. The crown blocks 5C are divided by two crown main grooves 3B and the crown lateral grooves 4C.

Figure 2:
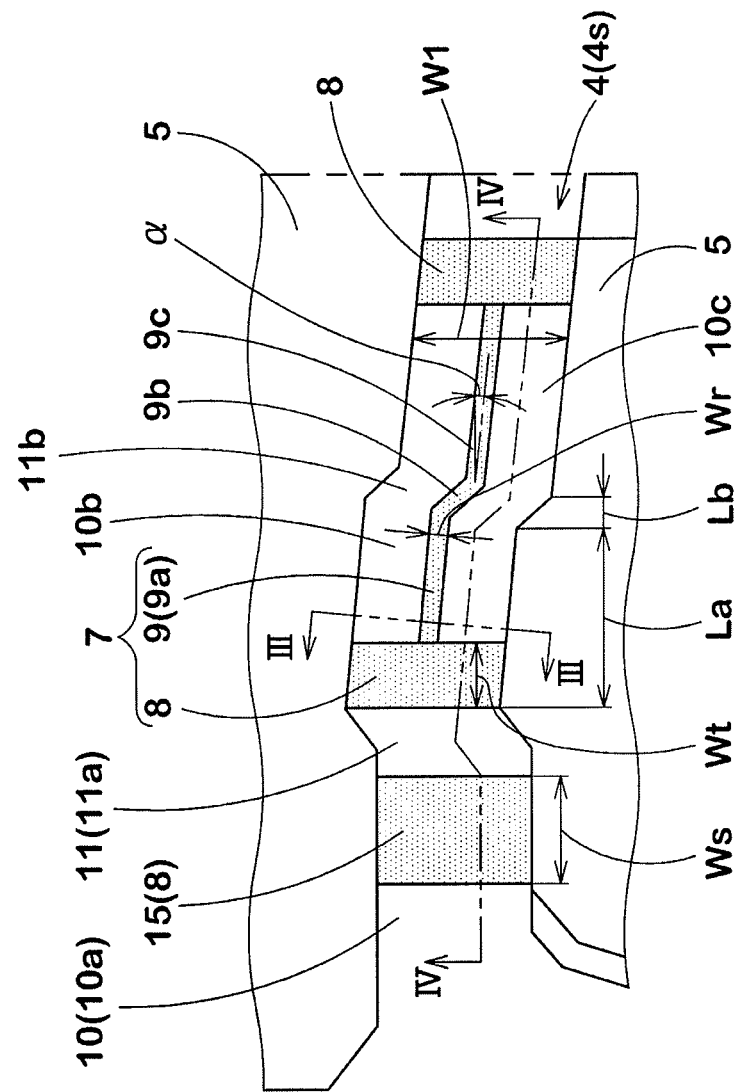
FIG. 2 is a plan view of a lateral groove and blocks in accordance with an embodiment of the present disclosure.
Figure 3:
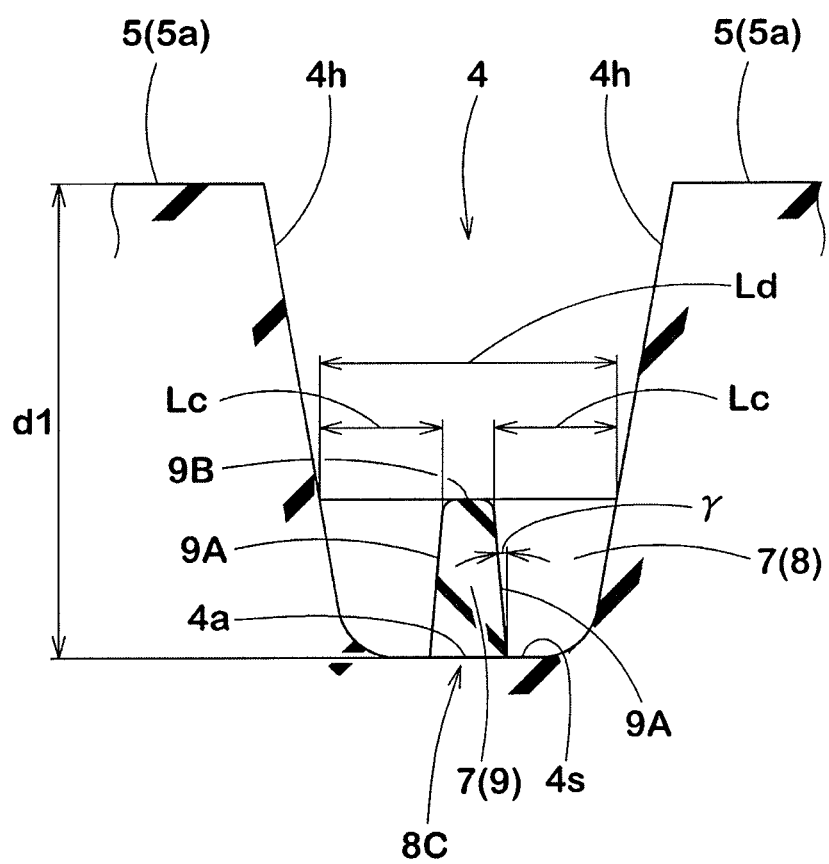
FIG. 3 is a cross-sectional view taken along line III-III of FIG. 2.
Figure 4:
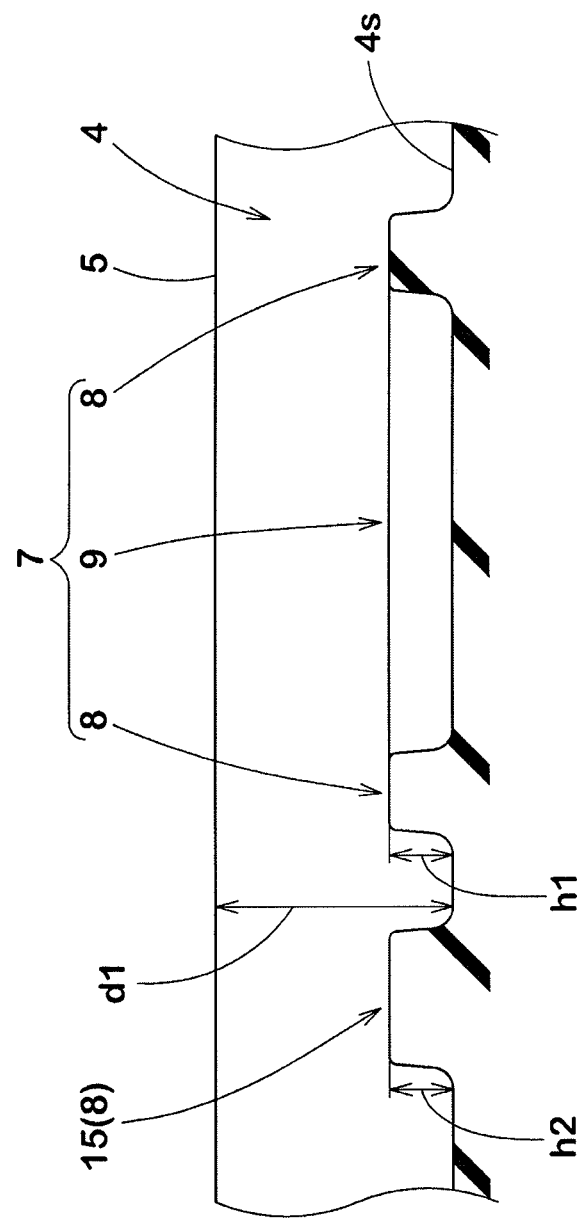
FIG. 4 is a cross-sectional view taken along line IV-IV of FIG. 2.

FIG. 2 illustrates a plan view of one lateral groove 4 and a pair of blocks 5 arranged adjacently in the tire circumferential direction through the lateral groove 4 in accordance with one embodiment. FIG. 3 illustrates a cross-sectional view taken along line III-III of FIG. 2, and FIG. 4 illustrates a cross-sectional view taken along line IV-IV of FIG. 2. As illustrated in FIG. 3, the lateral groove 4 includes a groove bottom 4s including a maximum depth portion 4a and a pair of groove walls 4h each extending radially outwardly from the groove bottom 4s to a ground contact surface 5a of the corresponding block 5. As used herein, the groove bottom 4s is defined as a bottom side region that forms 10% of the maximum depth d1 of the lateral groove 4 from the maximum depth portion 4a.

As illustrated in FIG. 2 to FIG. 4, at least one of the lateral grooves 4, preferably a plurality of lateral grooves, is provided with a first projected portion 7 having a localized raised bottom from the groove bottom 4s. The first projected portion 7 can suppress that stones get trapped in the lateral groove 4 during traveling. Note that to help understanding the first projected portion 7 and a second projected portion 15 which will be described later, they are shown in gray color in FIG. 2.

The first projected portion 7, in this embodiment, includes at least one tie-bar portion 8 connecting a pair of blocks 5 with each other, and a narrow rib-portion 9 extending in the longitudinal direction of the lateral groove from the tie-bar portion 8 without being connected to the pair of blocks 5. The tie-bar portion 8 connects the pair of blocks 5 with each other to enhance block rigidity. The pair of blocks 5 having enhanced block rigidity help to push stones out from the lateral groove 4 at an early stage of stone-biting in the lateral groove 4. The narrow rib-portion 9 can suppress that stones get trapped in the lateral groove 4. Further, the narrow rib-portion 9 which has one end connected to the tie-bar portion 8 with a relatively high rigidity can suppressing bending down itself. Thus, the narrow rib-portion 9 can avoid stone-biting in a gap between the narrow rib-portion 9 and one of the groove walls 4h, resulting in suppressing breaking off the narrow rib-portion 9 for a long term. Accordingly, the tire 1 in accordance with the embodiment can avoid stone-biting for a long term. In addition, since the tie-bar portion 8 enhances block rigidity of the connected blocks, a sufficient tread pattern rigidity can be maintained even when the lateral grooves are designed to have greater volume in order to improve on-snow road performance.

In this embodiment, the lateral groove 4 on which the first projected portion 7 is provided extends in a zigzag manner. The zigzag lateral groove 4 can help to disperse tire load acting on the blocks 5 in multi directions at the time of the tire comes into contact with the ground, leading to improve stone ejecting effect.

The lateral groove 4, in this embodiment, includes one or more axial portions 10 each extending in the tire axial direction and one or more inclined portions 11 each having an angle α greater than that of the axial portions 10 with respect to the tire axial direction. The axial portions 10, in this embodiment, include a first axial portion 10a, a second axial portion 10b, and a third axial portion 10c. The inclined portions 11, in this embodiment, include a first inclined portion 11a and a second inclined portion 11b inclined in an opposite direction to the first inclined portions 11a with respect to the tire axial direction. In this embodiment, the second inclined portion 11b, the second axial portion 10b and the third axial portion 10c are inclined in the same direction as with each other with respect to the tire axial direction. Since snow can move smoothly in these portions

11b, 10b and 10c upon driving on snow roads, snow-removing property of the groove can be improved. Note that the lateral groove 4 on which the first projected portion 7 be provided is not limited to the above aspect.

The lateral groove 4, in this embodiment, has a substantially constant groove width W1 which helps to improve the above-mentioned stone ejecting effect. As used herein, "a substantially constant" regarding a groove width shall mean not only an aspect where the whole region of the groove has a same groove width but also an aspect where although the groove width varies, the groove width difference is within 10%, i.e., a ratio of the minimum groove width to the maximum groove width being equal to or more than 90%.

Although it is not particularly limited, axial lengths Lb of the inclined portions 11 are preferably in a range of from 5% to 35% of axial lengths La of the axial portions 10. Thus, on-snow road performance can be improved since snow held in the lateral groove 4 can move smoothly to the main groove 3 or the tread edge Te. Further, the stone ejecting effect can further be improved.

In some preferred embodiments, the first projected portion 7 may include two tie-bar portions 8 and one narrow rib-portion 9 connecting the two tie-bar portions 8. The first projected portion 7 as such can surely prevent the narrow rib-portion 9 from bending down itself. Thus, breaking away of the narrow rib-portion 9 can further be suppressed.

The tie-bar portions 8, for example, extend in a straight manner in a plan view thereof. In this embodiment, the tie-bar portions 8 extend in a direction perpendicular to the longitudinal direction of the lateral groove 4 to enhance block rigidity further. Note that the tie-bar portions 8 are not limited to such an aspect but can be modified in various aspects, e.g., extending in a circular arc or wavy manner in the plan view.

In this embodiment, the tie-bar portions 8 are provided on the axial portions 10 of the lateral groove 4 to enhance block rigidity further. In the tie-bar portions 8 according to the embodiment, one is provided on the second axial portion 10b and the other one is provided on the third axial portion 10c.

Widths Wt of the tie-bar portions 8 in the longitudinal direction of the lateral groove 4 are preferably greater than a rib width Wr of the narrow rib-portion 9 in a direction perpendicular to the longitudinal direction of the rib-portion 9. Thus, the effect that enhances block rigidity and the effect that suppresses reduction in groove volume of the lateral groove 4 can be improved in a well-balanced manner. In order to improve the above effects further, the widths Wt of the tie-bar portions 8 are preferably in a range of from 2 to 6 times the rib width Wr of the narrow rib-portion 9.

In order to improve the above effects further, the widths Wt of the tie-bar portions 8 are preferably in a range of from 5% to 15% of the maximum width WB (shown in FIG. 1) of the blocks 5.

As illustrated in FIG. 3, the narrow rib-portion 9 is connected to center regions 8C of the tie-bar portions 8 in the tire circumferential direction. Thus, on both sides of the narrow rib-portion 9 in the rib-width direction, a pair of substantially equally divided gaps having widths Lc between the narrow rib-portion 9 and each groove wall 4 is formed. This structure can effectively suppress that stones are trapped in the gaps. As used herein, each of the center regions 8C of the tie-bar portions 8 shall mean a centered region of the tie-bar portion 8 having a length Ld of 30% of the tie-bar portion 8.

As illustrated in FIG. 2, the narrow rib-portion 9, in this embodiment, extends in a zigzag manner to suppress stone-biting to the lateral groove 4 effectively.

The narrow rib-portion 9, in this embodiment, extends along the lateral groove 4 on which the narrow rib-portion 9 is provided. Thus, since widths Lc of the gaps between the narrow rib-portion 9 and each groove wall 4 are substantially constant over the narrow rib-portion 9 in the longitudinal direction, stone-biting can be suppressed more effectively. Preferably, the narrow rib-portion 9 extends such that the difference between angles with respect to the tire axial direction of the narrow rib-portion 9 and the lateral groove 4 is within 5 degrees.

The narrow rib-portion 9, in this embodiment, includes a first portion 9a extending along the second axial portion 10b, a second portion 9b extending along the second inclined portion 11b, and a third portion 9c extending along the third axial portion 10c. That is, the narrow rib-portion 9, in a middle region thereof, includes the second portion 9b which is inclined in a different angle from the both portions thereof. Thus, even when stone-biting occurs in the middle region, load from stones can be dispersed through the narrow rib-portion 9, resulting in suppressing cracks on the groove effectively. Note that the narrow rib-portion 9 is not limited to the above aspect.

Preferably, an axial length Le of the narrow rib-portion 9, as shown in FIG. 1, is equal to or more than 20% of the maximum width WB of the block 5 in the tire axial direction, more preferably equal to or more than 25%, but preferably equal to or less than 50% of the maximum width WB, more preferably equal to or less than 45%, in order to improve the effect that suppresses stone-biting while maintaining on-snow performance.

As illustrated in FIG. 3, the narrow rib-portion 9, in a cross-sectional view perpendicular to the longitudinal direction of the lateral groove 4, includes a pair of sidewalls 9A extending radially outwardly from the groove bottom 4s in a tapered manner, and a top surface 9B facing radially outwardly and connecting the pair of sidewalls 9A. The sidewalls 9A as mentioned above help to maintain sufficient groove volume of the lateral groove 4 as well as to enhance rigidity of the base portion thereof to suppress cracks on the groove bottom 4s.

Preferably, angles γ of the sidewalls 9A with respect to the tire radial direction is in a range of from 5 to 20 degrees in order to improve the above effect further.

As illustrated in FIG. 4, preferably, a height h1 of the first projected portion 7 from the groove bottom 4s is in a range of from 20% to 50% of the maximum groove depth d1 of the lateral groove 4 in order to improve the effect that suppresses stone-biting while maintaining on-snow performance.

In order to improve the above effect further, preferably, a volume S1 of the first projected portion 7 is in a range of from 10% to 25% of a total volume S2 of the volume S1 of the first projected portion and the lateral groove 4.

In some preferred embodiments, the lateral groove 4 is further provided with a second projected portion 15 having a raised bottom protruding from the groove bottom 4s on a location away from the first projected portion 7.

As illustrated in FIG. 2, the second projected portion 15 according to the embodiment consists of a single tie-bar portion 8 connecting the pair of blocks 5. The second projected portion 15 can enhance block rigidity, improving the stone ejecting effect. Note that the second projected portion 15 is not limited to the above aspect but may be configured to include not only the tie-bar portion 8 but also at least one narrow rib-portion 9 extending from the tie-bar portion 8, for example.

The second projected portion 15, in this embodiment, is arranged axially inwardly of the first projected portion 7, i.e., on the tire equator C side. Thus, on the tire equator C side where a large ground contact pressure tends to act, since block rigidity, especially block rigidity in the tire circumferential direction, can be enhanced, the stone ejecting effect can be improved further.

The second projected portion 15, i.e., the tie-bar portion 8, is provided on the first axial portion 10a, for example. In this embodiment, since each of the axial portions 10a to 10c are provided with the respective tie-bar portions 8, block rigidity can be enhanced further, the effect that suppresses stone biting can be maintained for a long term.

A width Ws of the second projected portion 15, i.e., the tie-bar portion 8, in the longitudinal direction of the lateral groove 4 is preferably longer than the width Wt of the tie-bar portion 8 of the first projected portion 7. Thus, since block rigidity on the tire equator C side can be enhanced, stone ejecting effect can be improved further.

In order to improve the above effect and on-snow performance in a well-balanced manner, the width Ws of the tie-bar portion 8 of the second projected portion 15 is in a range of from 1.3 to 2.0 times the width Wt of the tie-bar portion 8 of the first projected portion 7.

As illustrated in FIG. 4, preferably, a height h2 of the second projected portion 15 from the groove bottom 4s is in a range of from 60% to 140% of the height h1 of the first projected portion 7.

As illustrated in FIG. 1, in this embodiment, the first projected portion 7 is provided on only the shoulder lateral grooves 4A. The shoulder lateral grooves 4A, in general, can discharge snow easily through the tread edge Te compared with the middle lateral grooves 4B and the crown lateral grooves 4C. Thus, even when the first projected portion 7 and the second projected portion 15 are provided on the shoulder lateral grooves 4A, reduction in on-snow performance can be suppressed. Alternatively, the first projected portion 7 and the second projected portion 15 may be provided on the crown lateral grooves 4C and/or the middle lateral grooves 4B since these grooves 4C and 4B tend to receive relatively large ground contact pressure which may cause stone biting. Namely, the first projected portion 7 as well as the second projected portion 15 may be provided on one or more middle lateral grooves 4B, or one or more crown lateral grooves 4C.

While the particularly preferable embodiments in accordance with the present disclosure have been described in detail, the present disclosure is not limited to the illustrated embodiments but can be modified and carried out in various aspects.

EXAMPLE

Figure 5A:
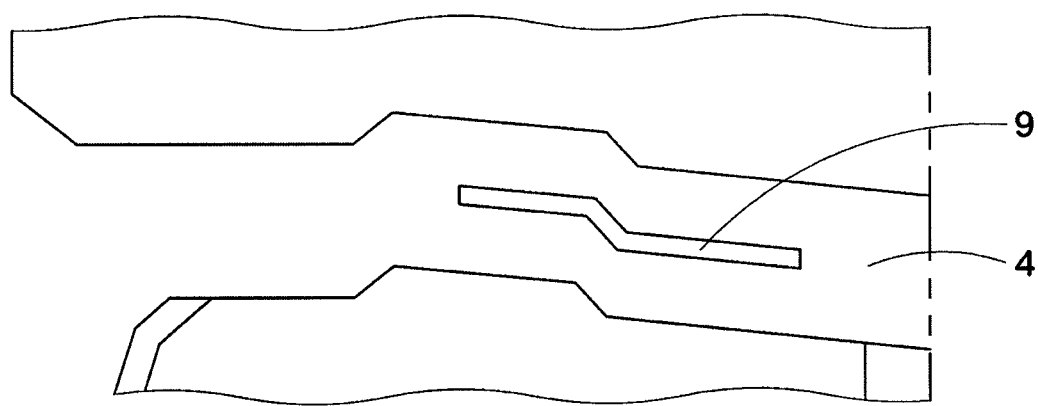
FIG. 5A is an enlarged view of a shoulder lateral groove in accordance with a comparative example.
Figure 5B:
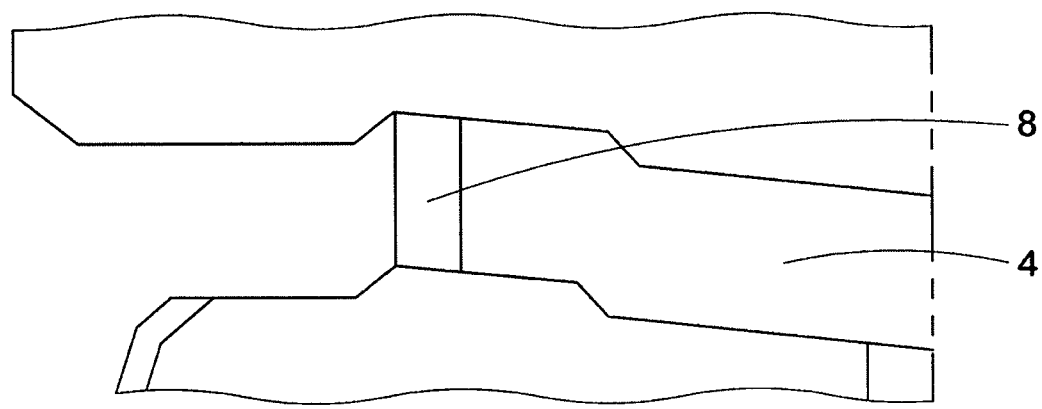
FIG. 5B is an enlarged view of a shoulder lateral groove in accordance with another comparative example.

Tires with the tread pattern as shown in FIG. 1 were manufactured by way of trial based on the specification in Table 1, and then on-snow performance and stone-biting resistance thereof were tested. The common specification and the testing method of the test tires are as follows. Note that FIGS. 5A and 5B show the respective shoulder lateral grooves in accordance with comparative examples 1 and 2 (Ref. 1 and Ref. 2).

Narrow rib-portion axial length Le/shoulder block maximum width WB=37%

Tie-bar portion height h2 of second projected portion/height h1 of first projected portion=95%

Tie-bar portion width Wt of second projected portion/shoulder blocks maximum width WB=12%

On-Snow Performance Test:

Each set of test tires was mounted onto a four-wheel drive vehicle having a displacement of 3600 cc as the all wheels under the following conditions:

rim size: 17×8.0 J; and inner pressure: 240 kPa (all wheels).

Then, a test driver drove the test vehicle on a test course covered with snow to evaluate driving performance, e.g., traction, braking property and steering stability by the driver's sense. The test results are shown in Table 1 using a score system, wherein Ref. 1 is set to 100. The larger the value, the better the performance is.

Stone-Biting Resistance and Durability Test:

After a test driver drove the vehicle on unpaved gravel test course for 15,000 km, occurrences of stone-biting (stone-biting resistance) and cracks on the projected portions were checked by the driver with the naked eyes. The test results are shown in Table 1 using a score system, wherein Ref. 1 is set to 100. The larger the value, the better the performance is.

Table 1 shows the test results.

TABLE 1

|  | Ref. 1 | Ref. 2 | Ex. 1 | Ex. 2 | Ex. 3 | Ex. 4 | Ex. 5 |
| --- | --- | --- | --- | --- | --- | --- | --- |
| Shoulder lateral groove configuration | FIG. 5A | FIG. 5B | FIG. 2 | FIG. 2 | FIG. 2 | FIG. 2 | FIG. 2 |
| Number of tie-bar portion(s) in each first projected portion | 0 | 1 | 2 | 1 on tire equator side | 2 | 2 | 2 |
| First projected portion height h1/d1 (%) | 30 | 30 | 30 | 30 | 15 | 20 | 50 |
| Ratio S1/S2 (%) | 10 | 10 | 20 | 20 | 20 | 20 | 20 |
| Second projected portions | none | none | presence | presence | presence | presence | presence |
| On-snow performance [score] | 100 | 100 | 98 | 100 | 100 | 98 | 97 |
| Stone-biting resistance [score] | 100 | 90 | 110 | 110 | 106 | 108 | 110 |
| Durability [score] | 100 | 110 | 115 | 110 | 110 | 113 | 115 |

|  | Ex. 6 | Ex. 7 | Ex. 8 | Ex. 9 | Ex. 10 | Ex. 11 |
| --- | --- | --- | --- | --- | --- | --- |
| Shoulder lateral groove configuration | FIG. 2 | FIG. 2 | FIG. 2 | FIG. 2 | FIG. 2 | FIG. 2 |
| Number of tie-bar portion(s) in first projected portion | 2 | 2 | 2 | 2 | 2 | 2 |

TABLE 1-continued

| | | | | | | |
|---|---|---|---|---|---|---|
| First projected portion height h1/d1 (%) | 55 | 30 | 30 | 30 | 30 | 30 |
| Ratio S1/S2 (%) | 20 | 5 | 10 | 25 | 30 | 20 |
| Second projected portions | presence | presence | presence | presence | presence | none |
| On-snow performance [score] | 97 | 100 | 98 | 97 | 97 | 102 |
| Stone-biting resistance [score] | 112 | 106 | 108 | 110 | 112 | 108 |
| Durability [score] | 110 | 110 | 113 | 115 | 110 | 112 |

From the test results, it is confirmed that the example tires have improved stone-biting resistance and durability while suppressing reduction in on-snow performance, compared to the comparative example tires. In another test where different test tires having projected portions on the crown lateral grooves or the middle lateral grooves was checked in the same way as the above test, the results showed the same trend of Table 1. It is confirmed that the same trend of Table 1 was also shown in another test where different test tires having different shapes of first and second projected portions which satisfy preferred ranges as described above were used.

What is claimed is:

1. A tire comprising:
    a tread portion being provided with lateral grooves extending in a tire axial direction and blocks divided by the lateral grooves;
    at least one of the lateral grooves being provided with a first projected portion having a bottom protruding from a groove bottom of the at least one of the lateral grooves;
    the first projected portion comprising at least one tie-bar portion extending across the at least one of the lateral grooves at a constant radial height and connecting a pair of blocks with each other, the pair of blocks being arranged adjacently through the at least one of the lateral grooves, and a narrow rib-portion extending in a longitudinal direction of the at least one of the lateral grooves from the at least one tie-bar portion without being connected to the pair of blocks,
    wherein the tie-bar portion and the rib-portion have equal radial heights measured from the groove bottom.

2. The tire according to claim 1,
    wherein the at least one tie-bar portion has a width in the longitudinal direction of the at least one of the lateral grooves greater than a rib width of the narrow rib-portion measured in a direction perpendicular to the longitudinal direction of the at least one of the lateral grooves.

3. The tire according to claim 2,
    wherein the narrow rib-portion is connected to a center region of the at least one tie-bar portion in a tire circumferential direction.

4. The tire according to claim 2,
    wherein the first projected portion comprises two tie-bar portions and the narrow rib-portion connecting the two tie-bar portions with each other.

5. The tire according to claim 2,
    wherein the narrow rib-portion extends in a zigzag manner.

6. The tire according to claim 1,
    wherein the narrow rib-portion is connected to a center region of the at least one tie-bar portion in a tire circumferential direction.

7. The tire according to claim 6,
    wherein the first projected portion comprises two tie-bar portions and the narrow rib-portion connecting the two tie-bar portions with each other.

8. The tire according to claim 6,
    wherein the narrow rib-portion extends in a zigzag manner.

9. The tire according to claim 1,
    wherein the first projected portion comprises two tie-bar portions and the narrow rib-portion connecting the two tie-bar portions with each other, and wherein the two tie-bar portions have equal radial heights measured from the groove bottom.

10. The tire according to claim 9,
    wherein the narrow rib-portion extends in a zigzag manner.

11. The tire according to claim 1,
    wherein the narrow rib-portion extends in a zigzag manner.

12. The tire according to claim 11,
    wherein the at least one of the lateral grooves extends in a zigzag manner, and the narrow rib-portion is extending in a zigzag manner along the at least one of the lateral grooves.

13. The tire according to claim 1,
    wherein a radial height of the first projected portion from the groove bottom is in a range of from 20% to 50% of a maximum depth of the at least one of the lateral grooves.

14. The tire according to claim 1,
    wherein the narrow rib-portion comprises a pair of sidewalls extending radially outwardly from the groove bottom of the at least one of the lateral grooves in a tapered manner, in a cross-sectional view of the narrow rib-portion perpendicular to the longitudinal direction of the at least one of the lateral grooves.

15. The tire according to claim 1,
    the at least one of the lateral grooves being further provided with a second projected portion having a bottom protruding from the groove bottom on a location away from the first projected portion, and
    the second projected portion consisting of a tie-bar portion connecting the pair of blocks.

16. The tire according to claim 15,
    wherein the second projected portion is arranged axially inwardly of the first projected portion.

17. The tire according to claim 1,
    wherein the first projected portion comprises two tie-bar portions and the narrow rib-portion connecting the two tie-bar portions with each other, and
    a length of the narrow rib-portion in the longitudinal direction of the at least one of the lateral grooves is greater than each width of the two tie-bar portions in the longitudinal direction of the at least one of the lateral grooves.

18. The tire according to claim 1,
    an axial length Le of the narrow rib-portion is equal to or more than 20% of a maximum width WB of the blocks in the tire axial direction.

19. A tire comprising:

a tread portion being provided with lateral grooves extending in a tire axial direction and blocks divided by the lateral grooves;

at least one of the lateral grooves being provided with a first projected portion having a bottom protruding from a groove bottom of the at least one of the lateral grooves;

the first projected portion comprising at least one tie-bar portion extending across the at least one of the lateral grooves at a constant radial height and connecting a pair of blocks with each other, the pair of blocks being arranged adjacently through the at least one of the lateral grooves, and a narrow rib-portion extending in a longitudinal direction of the at least one of the lateral grooves from the at least one tie-bar portion without being connected to the pair of blocks, wherein the first projected portion comprises two tie-bar portions and the narrow rib-portion connecting the two tie-bar portions with each other, and wherein the narrow rib-portion comprises a pair of sidewalls extending radially outwardly from the groove bottom of the at least one of the lateral grooves in a tapered manner, in a cross-sectional view of the narrow rib-portion perpendicular to the longitudinal direction of the at least one of the lateral grooves.

20. A tire comprising:

a tread portion being provided with lateral grooves extending in a tire axial direction and blocks divided by the lateral grooves;

at least one of the lateral grooves being provided with a first projected portion having a bottom protruding from a groove bottom of the at least one of the lateral grooves;

the first projected portion comprising at least one tie-bar portion extending across the at least one of the lateral grooves at a constant radial height and connecting a pair of blocks with each other, the pair of blocks being arranged adjacently through the at least one of the lateral grooves, and a narrow rib-portion extending in a longitudinal direction of the at least one of the lateral grooves from the at least one tie-bar portion without being connected to the pair of blocks, wherein the narrow rib-portion extends in a zigzag manner, and wherein the narrow rib-portion comprises a pair of sidewalls extending radially outwardly from the groove bottom of the at least one of the lateral grooves in a tapered manner, in a cross-sectional view of the narrow rib-portion perpendicular to the longitudinal direction of the at least one of the lateral grooves.

* * * * *